United States Patent [19]

Ishikawa

[11] Patent Number: 5,479,998
[45] Date of Patent: Jan. 2, 1996

[54] ELECTRONIC POWERED MOTOR VEHICLE

[75] Inventor: Hirotomo Ishikawa, Yokohama, Japan

[73] Assignee: Namco Ltd., Tokyo, Japan

[21] Appl. No.: 201,396

[22] Filed: Feb. 24, 1994

[51] Int. Cl.$^6$ .................... B62D 61/10; B62D 61/08; B62M 7/10; B60K 17/30

[52] U.S. Cl. .................. 180/23; 180/214; 180/13; 180/255

[58] Field of Search ................. 180/23, 24, 22, 180/211, 213, 214, 13, 252, 253, 254, 255, 256, 257

[56] References Cited

U.S. PATENT DOCUMENTS

| 472,200 | 4/1892 | Seiler | 254/1 |
|---|---|---|---|
| 1,266,904 | 5/1918 | Baker | 180/211 |
| 1,389,572 | 9/1921 | Berg | 248/188.4 |
| 1,482,527 | 2/1924 | Simpson | 16/34 |
| 2,306,042 | 12/1942 | Custer | 180/214 |
| 2,825,416 | 3/1958 | Schroeder et al. | 180/24 |
| 3,062,559 | 11/1962 | Hewitt | 280/202 |
| 3,570,620 | 3/1971 | Fisher et al. | 180/214 |
| 3,858,673 | 1/1975 | Browning | 180/26 |
| 4,403,673 | 9/1983 | Ball | 180/214 |
| 4,750,578 | 6/1988 | Brandenfels | 180/214 X |
| 5,067,581 | 11/1991 | Nicol | 180/211 X |

FOREIGN PATENT DOCUMENTS

| 1051178 | 2/1959 | Germany | 180/214 |
|---|---|---|---|
| 2915387 | 10/1980 | Germany | 180/214 |
| 0020280 | 1/1988 | Japan | 180/214 |
| 5049756 | 3/1993 | Japan | 180/74 |
| 328059 | 4/1930 | United Kingdom . | |
| 492352 | 12/1993 | United Kingdom . | |
| 3014968 | 8/1993 | WIPO | 180/214 |

*Primary Examiner*—Margaret A. Focarino
*Assistant Examiner*—F. Zeender
*Attorney, Agent, or Firm*—Thomas E. Schatzel

[57] ABSTRACT

A motor vehicle with an on-board propelling power source and operator control functions for steering, increasing and decreasing the vehicles rate of motion. The vehicle includes a chassis with an operator seat for receiving a human operator; a front wheel that can be laterally directed by the operator so the operator can steer the vehicle; a front wheel which is connected to an electronic motor for propelling the vehicle; a drive-gear train assembly for transferring the rotational power of the electronic motor to rotational power of the front wheel; a pair of rear wheels spaced laterally relative to each other for supporting and assisting in maneuvering the vehicle; and a pair of front stabilizing wheels spaced laterally from the front wheel with the front wheel intermediate to the front stabilizing wheels. The steering mechanism, drive-gear train assembly, and electronic motor are attached to a steering shaft and rotate with the steering shaft.

8 Claims, 2 Drawing Sheets

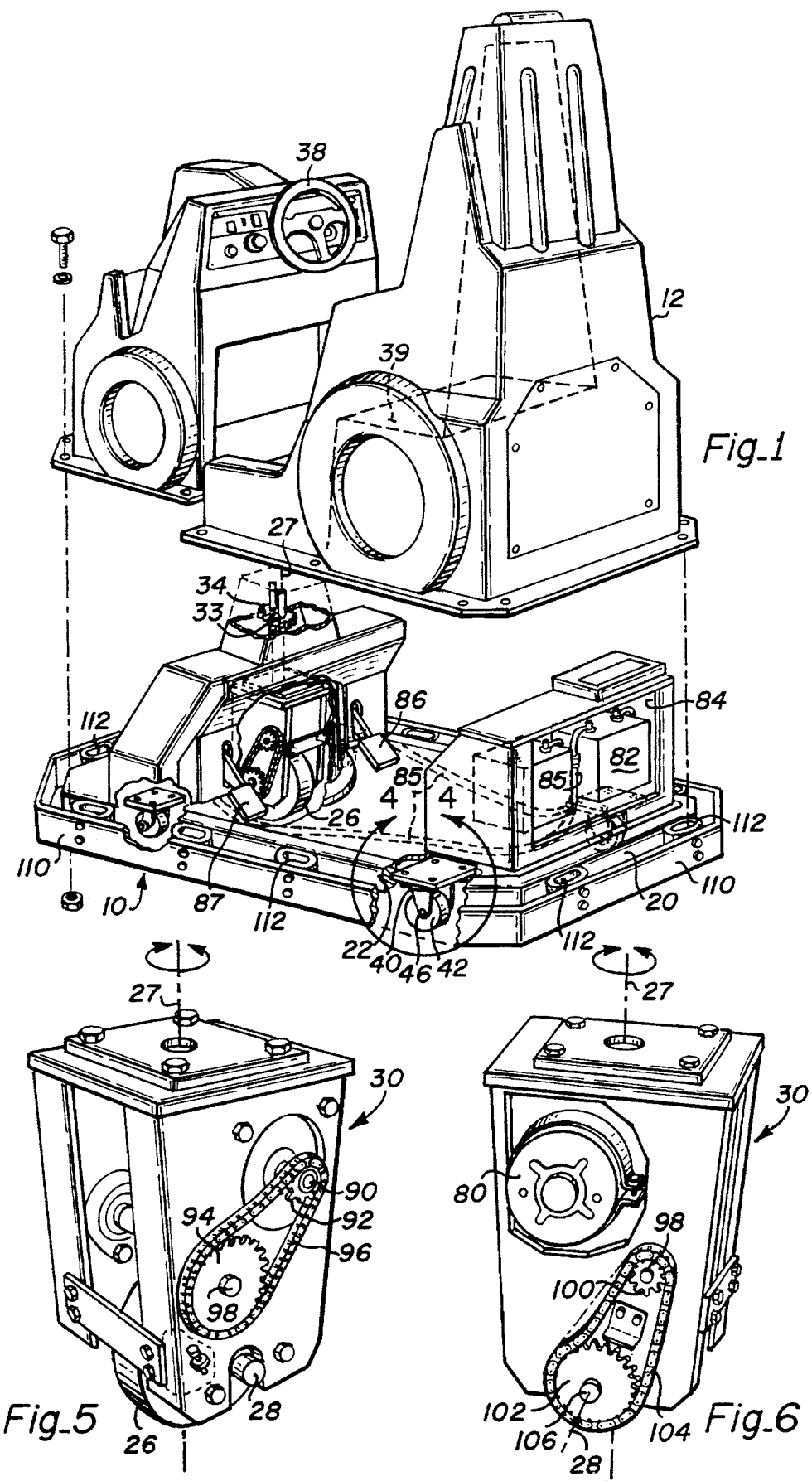

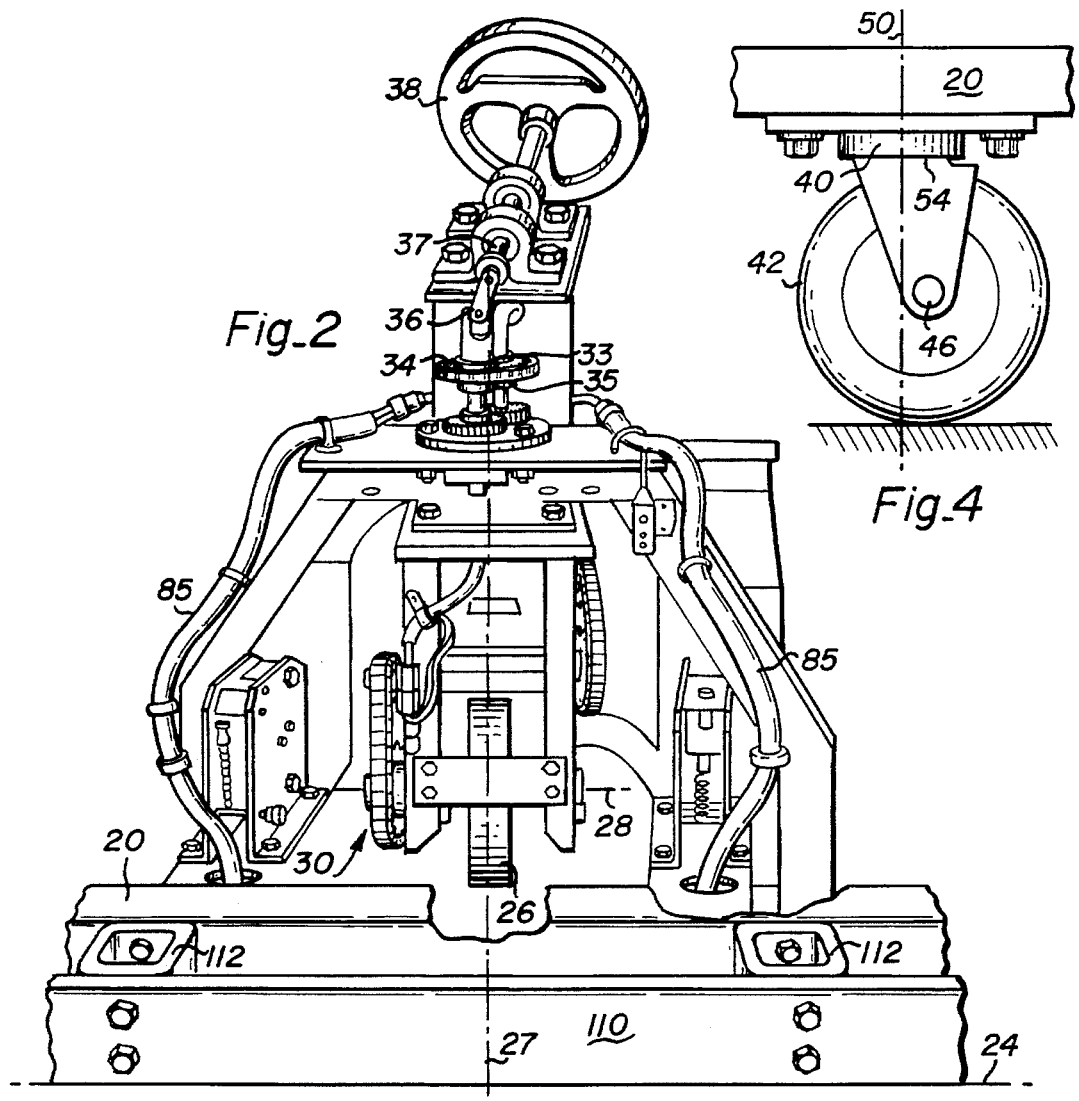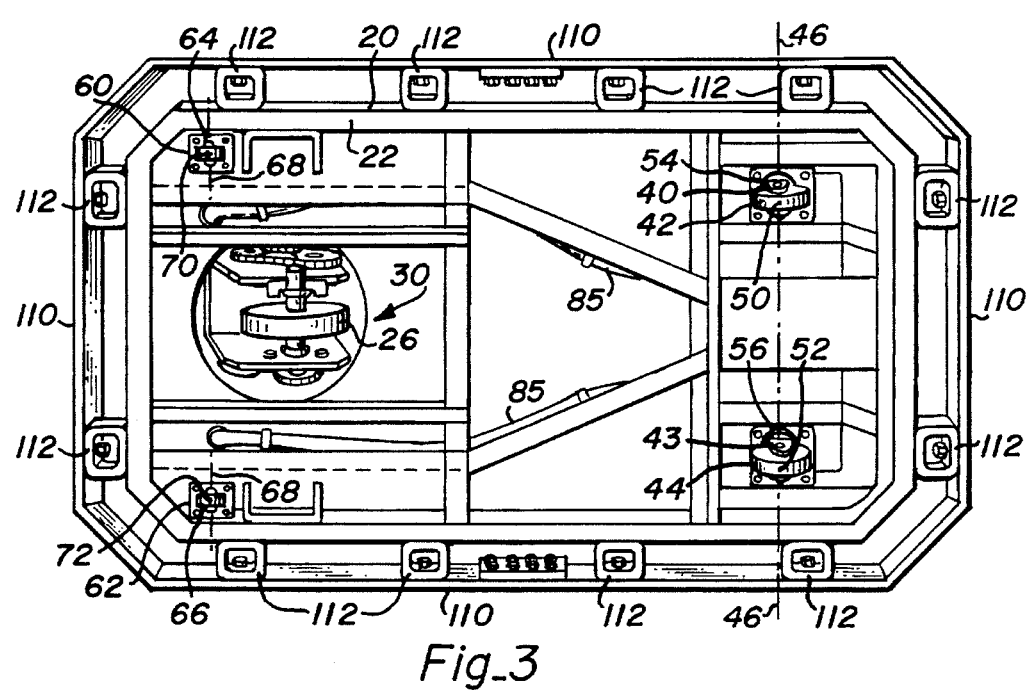

ELECTRONIC POWERED MOTOR VEHICLE

BACKGROUND OF THE INVENTION

1. Field of the Invention

This invention relates generally to a motor vehicle with an on-board propelling power source and maneuverable by a human operator. More particularly, but not by way of limitation, this invention relates to a recreational vehicle for transporting at least one human and includes a chassis, stabilizing wheels, an electronic motor, a drive-gear train assembly, and a steering means for maneuvering by a human operator.

2. Description of the Prior Art

It is often desirable to operate and/or ride in a small vehicle with an on-board propelling power source. Examples of such vehicles include golf carts, go-carts, bumper cars and vehicles for transporting handicapped people. Vehicles of this design are used to accomplish work, recreational enjoyment and personal use.

Prior art which makes use of vehicles with on-board propelling power sources and operator controls contain several undesirable features. Some of these vehicles may contain three wheels, instead of five, and therefore the three wheel vehicle is more unstable and dangerous. If a vehicle does not use an electric motor, pollution will be generated. Safety features such as bumpers may not be installed on vehicles, and therefore the vehicle is unable to withstand collisions with similar vehicles.

Additionally, prior art does not combine the front wheel with a steering means, drive means, and a motor all attached and rotatable around a central steering axis. By combining the steering means, drive means and motor to a central axis, there are less moving parts, repairs are less common, and maintenance is reduced. Due to the weight of the motor and drive-gear assembly being distributed mainly on one wheel, traction for that wheel is increased and performance is enhanced.

SUMMARY OF THE PRESENT INVENTION

It is therefore an object of the present invention to provide a recreational vehicle to transport at least one human.

It is another object of the present invention to provide a recreational vehicle which is enjoyable to utilize.

It is another object of the present invention to provide a recreational vehicle which does not generate pollution.

It is another object of the present invention to provide a recreational vehicle which is safe to operate by the operator.

It is another object of the present invention to provide a recreational vehicle which is readily maneuverable by a human operator.

It is another object of the present invention to provide a recreational vehicle which is stable while stationary and moving.

It is another object of the present invention to provide a recreational vehicle which requires minimal maintenance.

It is another object of the present invention to provide a recreational vehicle which requires a minimal amount of moving parts and is therefore reliable.

It is another object of the present invention to provide a recreational vehicle which can withstand collisions with similar vehicles.

It is another object of the present invention to provide a recreational vehicle which can be stopped in response to signals by the operator.

Briefly, a preferred embodiment of the present invention includes a motor vehicle with an on-board propelling power source and operator control functions for steering, increasing and decreasing the vehicles rate of motion. The vehicle includes a chassis with an operator seat for receiving a human operator; a front wheel that can be laterally directed by the operator so the operator can steer the vehicle; a front wheel which is connected to an electronic motor for propelling the vehicle; a drive-gear train assembly for transferring the rotational power of the electronic motor to rotational power of the front wheel; a pair of rear wheels spaced laterally relative to each other for supporting and assisting in maneuvering the vehicle; and a pair of front stabilizing wheels spaced laterally from the front wheel with the front wheel intermediate to the front stabilizing wheels. The steering mechanism, drive-gear train assembly, and electronic motor are attached to a steering shaft and rotate with the steering shaft.

An advantage of the present invention is that it provides a recreational vehicle for transporting at least one human.

Another advantage of the present invention is that it provides a recreational vehicle which is enjoyable to utilize.

Another advantage of the present invention is that it provides a recreational vehicle which does not generate pollution.

Another advantage of the present invention is that it provides a recreational vehicle which is safe to operate by the operator.

An advantage of the present invention is that it provides a recreational vehicle which is readily maneuverable by a human operator.

Another advantage of the present invention is that it provides a recreational vehicle which is stable while stationary and moving.

Another advantage of the present invention is that it provides a recreational vehicle which requires minimal maintenance.

Another advantage of the present invention is that it provides a recreational vehicle which requires a minimal amount of moving parts and is therefore reliable.

Another advantage of the present invention is that it provides a recreational vehicle which can withstand collisions with similar vehicles.

Another advantage of the present invention is that it provides a recreational vehicle which can be stopped in response to signals by the operator.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 1 is an exploded perspective view of the motor vehicle of the present invention with the body shell positioned above the motor vehicle;

FIG. 2 is a front side view of the vehicle of FIG. 1 without the body shell;

FIG. 3 is a bottom side view of the motor vehicle of FIG. 1;

FIG. 4 is a side view of a section of the chassis, a rear caster, and a rear wheel of the vehicle of FIG. 1 taken along the line 4—4.

FIG. 5 is a perspective view of the drive-gear train assembly of the vehicle of FIG. 2 viewed from the left side of the vehicle; and FIG. 6 is a perspective view of the drive-gear train assembly of the vehicle of FIG. 2 viewed from the right side of the vehicle.

DETAILED DESCRIPTION OF THE PREFERRED EMBODIMENT

FIG. 1 is an exploded perspective view of the motor vehicle of the present invention, referred to by general reference 10, with an exterior shell 12 shown above the mainframe to allow viewing of the interior components. Referring to FIGS. 1–3, a chassis 20 includes a lower surface 22 which establishes a plane 24 projecting horizontally with the ground. Near the front center area of the lower surface 22 is a front wheel 26 which projects perpendicular from the lower surface 22 to form a front wheel vertical axis 27. The front wheel 26 is rotatable three hundred and sixty degrees about an axis of rotation 28 parallel to the horizontal plane 24, and rotates less that two hundred and twenty degrees about the vertical axis 27. The front wheel 26 is joined to a drive-gear train assembly, referred to by the general reference character 30, which extends vertically about the axis 27. The drive-gear train assembly 30 is connected to a first rotatable sprocket 33. A second rotatable sprocket 34 of a diameter smaller than that of the sprocket 33, is connected to the sprocket 33 by a chain 35. The relationship of the sprocket 34 being smaller in diameter than the sprocket 33 creates a gear reduction. The sprocket 34 is joined to a U-joint 36 which is attached to the steering shaft 37. The steering shaft 37 is at an acute angle relative to the vertical drive-gear train assembly 30, and therefore the U-joint 36 is necessary to interconnect the steering shaft 32 with the drive-gear train assembly 30. The steering shaft 37 is joined to a steering wheel 38 positioned adjacent to an operator seat 39 for receiving a human operator and who can control the rotational movement of the steering wheel 38. When the operator rotates the steering wheel 38, the rotational power is transferred to the steering shaft 37, the U-joint 36, the sprocket 34, the chain 35, the sprocket 33, and the drive-gear train assembly 30 which rotates about the axis 27. This results in turning of the front wheel 26 about the axis 27. Since the steering wheel 38 controls the direction of the front wheel 26, the operator can control the direction of the vehicle 10 by rotating the steering wheel 38. As a result of the gear reduction between the sprocket 34 and 33, the front wheel 26 does not turn as great a distance relative to the steering wheel 38, and therefore the operator has increased control when directing the vehicle 10.

As illustrated in FIG. 3, a first rear caster 40, a first rear wheel 42, a second rear caster 43 and a second rear wheel 44 are mounted on the lower surface 22 of the chassis 20. The rear casters 40 and 43 are positioned about the rear end of the chassis 20 and spaced laterally relative to each other along a first rear wheel axis 46 extending parallel to the horizontal plane 24. The rear wheels 42 and 44 are joined to the rear casters 40 and 43, respectively, for supporting the rear wheels 42 and 44 and the chassis 20. The rear wheels 42 and 44 are rotatable about the first rear caster axis 46. Also rear wheel 42 is revolvable around a first rear caster axis of rotation 50 extending in a direction intersecting the horizontal plane 24. The rear wheel 44 is revolvable around a second rear caster axis of rotation 52 extending parallel to the axis 50, and through the rear wheel 44 A track 54 attached to caster 40 and a track 56 attached to caster 44 allows each rear wheel 42 and 44, respectively, to independently drift freely and rotate three hundred and sixty degrees around the caster axes 50 and 52, respectively, and independent from any other wheel. The tracks 54 and 56, casters 40 and 43, and rear wheels 42 and 44, allow the rear wheels 42 and 44 to turn independently and in a similar direction as the front wheel 26 to assist in directing the movement of the vehicle 10 and provide support for the chassis 20.

Near the front end of the chassis 20 and attached to the lower surface 22 of the chassis 20 is a first and second front caster 60 and 62. Each front-caster 60 and 62 is positioned laterally from the front wheel 26 with the front wheel 26 intermediate of each front caster 60 and 62. The front casters 60 and 62 each support a first and second front auxiliary stabilizing wheel 64 and 66, respectively. The alignment of the wheels 64 and 66 form a front wheel axis of rotation 68 extending parallel to the horizontal plane 24, and the front wheels 64 and 66 are rotatable about the axis 68. The front wheel 64 is revolvable around a first front caster axis 70 extending in a direction intersecting the horizontal plane 24 and through the front wheel 64. The front wheel 66 is revolvable around a second front caster axis 72 extending parallel to the axis 70 and through the front wheel 66. Each of the auxiliary stabilizing wheels 64 and 66 are freely revolvable three hundred and sixty degrees around the axes 70 and 72, respectively.

By positioning the front wheels 64 and 66 about opposing front edges of the chassis 20, the vehicle 10 is stabilized when turning. The axes 68 of the pair of front wheels 64 and 66 are independent from the rear wheel axis 46 and each wheel 42, 43, 64 and 66 independently drifts freely and revolves three hundred and sixty degrees around each caster axis 50, 52, 70 and 72, respectively. The independent rotation of the four wheels 42, 43, 64 and 66, and the placement of the wheels about the four corners of the lower surface 22 of the chassis 20 allows the vehicle 10 to maneuver smoothly and safely without tipping over.

The power source means of the vehicle 10 includes an electronic motor 80 connected with one or more electric batteries 82. The batteries 82 are stored underneath the operator seat 39 in a battery storage compartment 84. The batteries 82 store electricity and are connected to the motor 80 through wires 85 which allow electricity to travel from the batteries 82 to the motor 80. The electronic motor 80 transfers the electrical power to rotational power to provide power to propel the vehicle 10. An operator controls the rotational power that the electronic motor 80 exerts through an accelerator pedal 86 positioned near the location for an operator's right foot.

The electronic motor 80 is part of the drive-gear train assembly 30 which is connected to the front wheel 26. The drive-gear train assembly 30 transfers the rotational force created by the electronic motor 80 to rotation force for the front wheel 26 which moves the vehicle 10. FIGS. 5 and 6 illustrate opposite side views of the drive-gear train assembly 30. The motor 80 is connected to a first drive shaft 90. The rotational force of the motor 80 rotates the drive shaft 90. The drive shaft 90 is connected to a first rotatable sprocket 92. A second rotatable sprocket 94 of a diameter larger than that of the sprocket 92, is connected to the first sprocket 92 by a first drive chain 96. The relationship of the sprocket 92 being smaller in diameter than the sprocket 94 creates a first gear reduction. A second drive shaft 98, extending through the assembly 30, connects the sprocket 94 to a third rotatable sprocket 100 of a diameter smaller than the sprocket 94, thereby creating a second gear reduction. A fourth rotatable sprocket 102 of a diameter larger than that of the sprocket 100, is connected to the sprocket 100 by a second drive chain 104. The size of the sprocket 102 is of a diameter larger than that of the sprocket 100 thereby establishing another gear reduction. The sprocket 102 is attached to a third drive shaft 106 which is joined through the axis of rotation 28 to the front wheel 26. Therefore, as the electronic motor 80 rotates the drive shaft 90, the rotational power is transferred to the sprocket 92, the drive chain 96, the sprocket 94, the drive shaft 98, the sprocket 100, the drive chain 104, the sprocket 102, the drive shaft 106, which rotates the front wheel 26 about the axis 28, thereby moving the vehicle 10.

Gear reduction is necessary because the electric motor 80 creates a rotational speed many times faster than what is safe for the front wheel 26 to propel the vehicle 10. An alternative embodiment of the sprocket-chain gear reduction is to substitute the sprockets 92, 94, 100 and 102 With pulleys while substituting the chains 96 and 104 with belts. The numbers and/or the diameter of the sprockets 92, 94, 100 and 102, (or pulleys) can be altered to increase or decrease the potential speed of the vehicle 10.

A bumper 110 approximately three inches tall and comprised of a firm plastic, encircles the vehicle 10 parallel with the horizontal plane 24. A rectangular impact absorbing component 112 connects the bumper 110 with the edge of the chassis 20, and holds the bumper 110 approximately three inches from the chassis 20. There are numerous components 112 spaced about the edge of the chassis 20 joining the bumper 110 with the chassis 20. The component 112 and the bumper 110 are designed to flex when contacting other objects. The bumper 110 and the component 112 are designed to withstand collisions with other similar vehicles 10, thereby assisting in protecting the vehicle 10 and operator from harm.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alterations and modifications as fall within the true spirit and scope of the invention.

I claim:

1. A motor vehicle (10) with an on-board propelling power source (30) and operator control (38), comprising:

a chassis (20) including an operator seat (39) for receiving a human operator, said chassis (20) having a lower surface (22) establishing a horizontal plane (24);

a front wheel (26) projecting from said lower surface (22) of said chassis about a front end of said chassis (20), for steering said chassis, said front wheel (26) being rotatable about a first axis of rotation (28) parallel to said horizontal plane (24), and turnable about a first vertical axis of rotation (27) extending from said chassis (20) and intersecting said horizontal plane (24) and said first axis of rotation (28);

a pair of rear wheels (42, 44) mounted on said lower surface (22) of said chassis (20) and spaced laterally relative to each other along a second axis of rotation (46) extending parallel to said horizontal plane (24), each of said rear wheels (42, 44) being rotatable about said second axis of rotation (46) and positioned about a rear end of said chassis (20);

a steering means (38, 37) extending from said front wheel (26) to a position adjacent to said operator seat (39) to allow a human operator to control the direction of said front wheel (26) from said operator seat (39), the steering means including a control (38) for contact with said human operator and attached to a steering shaft (37);

a power source means (30) for propelling said front wheel (26), the power source means including an electronic motor (80) with means (85) to connect with an electronic battery (82);

a drive-gear train assembly (30) connecting said electronic motor (80) to said front wheel for translating rotation of said electric motor (80) to rotation of said front wheel (26), the drive-gear train assembly being rotatable about said first vertical axis (27) in response to motion of the steering means;

an interface gear means interconnecting the drive-gear assembly (30) to said steering shaft (37) including a U-joint (36) attached at one terminal end of said steering shaft (37), said U-joint (36) being connected to a rotatable shaft (33) engaged to the drive-gear train assembly (30), said rotatable shaft (33) being coaxial with said first vertical axis (27); and a first and second rear caster (40, 43) mounted on said lower surface (22) of said chassis (20) with each of said first and second rear caster (40, 43) joined to one of the rear wheels (42, 44) for supporting said rear wheels (42, 44) to said chassis (20), said first rear caster (40) being rotatable around a first rear caster axis (50) of rotation extending in a direction intersecting said horizontal plane (24) and said second axis of rotation, and said second rear caster (43) being rotatable around a second rear caster axis of rotation extending parallel to said first rear caster axis of rotation (50), whereby said rear wheels (42, 44) provide support for said chassis (20) and directional guidance.

2. The motor vehicle of claim 1 wherein, the interface gear means further includes a first rotatable sprocket (33) connected coaxially to said rotatable shaft, a second rotatable sprocket (34) axial about a second vertical axis parallel with said vertical axis, a chain (35) interconnecting said first and second sprockets (33, 34) and with said U-joint (36) joined to said second sprocket (34) whereby directional rotation of said steering shaft (37) causes corresponding similar directional rotation of the drive-gear train assembly (30) and the front wheel (26) about said first vertical axis of rotation (27).

3. The motor vehicle of claim 2 wherein, said first and second rear casters (40, 43) each drift freely and are rotatable three hundred and sixty degrees around said first and second caster axes of rotation (50), respectively, and independent from each other and said front wheel (26).

4. The motor vehicle of claim 3 wherein, each of said first and second rear casters (40, 43) includes a track means (54, 56) to allow each rear wheel (42, 44) to independently drift and freely rotate three hundred and sixty degrees around said first and second rear caster axes of rotation (50), respectively, thereby assisting said front wheel (26) in directing the movement of said vehicle (10).

5. The motor vehicle of claim 4 further including, two auxiliary stabilizing wheels joined to said lower surface of said chassis and each positioned laterally from said front wheel with said front wheel intermediate said auxiliary wheels, whereby said pair of auxiliary wheels provide stabilization.

6. The motor vehicle of claim 5 wherein, said two auxiliary stabilizing wheels are each mounted to a separate front caster attached to said lower surface of said chassis, each of said front casters supporting one of said auxiliary wheels with said supported auxiliary wheel freely rotatable three hundred and sixty degrees around a front caster axis, each of said front caster axes being substantially parallel to said rear caster axes.

7. The motor vehicle of claim 2 wherein, said drive-gear train assembly is connected with said steering shaft and includes a motor driving a first drive shaft with a first rotatable sprocket connected thereto, a second rotatable sprocket of a diameter larger than that of said first sprocket and a first drive chain interconnected to said first and second sprockets, thereby creating a first gear reduction; a second drive shaft connected to said second sprocket and to a third sprocket with said third sprocket being of a diameter smaller than said second sprocket, thereby creating a second gear reduction; and a third drive shaft interconnecting said front wheel and a fourth sprocket being of a diameter greater than said third sprocket and a second drive chain interconnecting said third and fourth sprockets, thereby creating a third gear reduction.

8. A motor vehicle of claim 2 wherein, said drive-gear train assembly is connected with said steering shaft and includes a motor driving a first drive shaft with a first rotatable pulley connected thereto, a second rotatable pulley of a diameter larger than that of said first pulley and a first drive belt interconnected to said first and second pulleys, thereby creating a first gear reduction; a second drive shaft connected to said second pulley and to a third pulley with said third pulley being of a diameter smaller than said second pulley, thereby creating a second gear reduction; and a third drive shaft interconnecting said front wheel and a fourth pulley being of a diameter greater than said third pulley and a second drive belt interconnecting said third and fourth pulley, thereby creating a third gear reduction.

* * * * *